(12) United States Patent
Lacasse et al.

(10) Patent No.: US 11,726,967 B2
(45) Date of Patent: *Aug. 15, 2023

(54) SYSTEMS AND METHODS FOR RESTORING AN INTERFACE TO A GLOBAL FILE SYSTEM

(71) Applicant: Nasuni Corporation, Boston, MA (US)

(72) Inventors: Christopher S. Lacasse, North Grafton, MA (US); Kevin William Baughman, Natick, MA (US); Robert Mason, Uxbridge, MA (US); Matthew M. McDonald, Burlington, MA (US); David M. Shaw, Newton, MA (US); Jon Vincent, Tyngsboro, MA (US)

(73) Assignee: Nasuni Corporation, Boston, MA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/146,020

(22) Filed: Jan. 11, 2021

(65) Prior Publication Data

US 2021/0314403 A1 Oct. 7, 2021

Related U.S. Application Data

(63) Continuation of application No. 15/204,018, filed on Jul. 7, 2016, now Pat. No. 10,893,102.

(Continued)

(51) Int. Cl.
*G06F 16/18* (2019.01)
*G06F 16/182* (2019.01)
(Continued)

(52) U.S. Cl.
CPC ........ *G06F 16/1873* (2019.01); *G06F 16/184* (2019.01); *G06F 16/1844* (2019.01); *H04L 67/1097* (2013.01); *H04L 67/02* (2013.01)

(58) Field of Classification Search
CPC .......... G06F 16/20; G06F 16/23; G06F 16/25; G06F 16/951; G06F 16/1873; G06F 16/184; G06F 16/1844
(Continued)

(56) References Cited

U.S. PATENT DOCUMENTS 8,880,474 B2* 11/2014 Mason ................ G06F 16/1873
707/649
2007/0038887 A1* 2/2007 Witte .................. G06F 11/2097
714/E11.073
(Continued)

FOREIGN PATENT DOCUMENTS

EP 0566895 A2 * 10/1993 ......... G06F 16/1873
GB 2374175 B * 7/2004 ........... G06F 16/183
(Continued)

*Primary Examiner* — Shahid A Alam
(74) *Attorney, Agent, or Firm* — David H. Judson

(57) ABSTRACT

A versioned file storage system (VFS) and method for operating and using the same is disclosed. In an aspect, a mechanism is provided wherein a first VFS interface unit coupling the VFS to a local data storage system is replaced with a second VFS interface unit in a coordinated procedure for taking the first unit offline, making a reliable snapshot of its data and cache structure in the VFS, and loading the same data and cache structure into the second VFS interface brought online. The first and second VFS interfaces transfer the necessary data to achieve the switch through respective side-loading daemons running in each interface. Clients in the local data storage system experience minimal interruption of services in the VFS.

13 Claims, 13 Drawing Sheets

Related U.S. Application Data

(60) Provisional application No. 62/189,420, filed on Jul. 7, 2015.

(51) Int. Cl.
*H04L 67/1097* (2022.01)
*H04L 67/02* (2022.01)

(58) Field of Classification Search
USPC .............. 707/681, 649, 674, 679, 684, 695; 715/229
See application file for complete search history.

(56) References Cited

U.S. PATENT DOCUMENTS

| | | | | |
|---|---|---|---|---|
| 2010/0191783 | A1* | 7/2010 | Mason ................ | G06F 16/9027 707/822 |
| 2012/0054156 | A1* | 3/2012 | Mason, Jr. .......... | G06F 16/1873 707/E17.007 |
| 2012/0089569 | A1* | 4/2012 | Mason, Jr. .......... | G06F 16/1873 707/639 |
| 2012/0101998 | A1* | 4/2012 | Cahill ................ | G06F 16/2329 707/654 |
| 2013/0111262 | A1* | 5/2013 | Taylor ................ | G06F 16/1865 714/4.11 |

FOREIGN PATENT DOCUMENTS

| | | | | |
|---|---|---|---|---|
| WO | WO-2005045556 A2 * | 5/2005 | ............. | G06F 12/00 |
| WO | WO-2005103963 A2 * | 11/2005 | ....... | G06F 16/30362 |
| WO | WO-2007100702 A2 * | 9/2007 | ........... | G06F 16/583 |

\* cited by examiner

SYSTEMS AND METHODS FOR RESTORING AN INTERFACE TO A GLOBAL FILE SYSTEM

RELATED APPLICATIONS

This application claims the benefit of and priority to U.S. Provisional Application No. 62/189,420, entitled "Systems and Methods for Restoring an Interface to a Global File System," filed on Jul. 7, 2015, which is incorporated herein by reference.

TECHNICAL FIELD

The present application relates generally to data storage, and more particularly to restoring an interface to a network-attached file system.

BACKGROUND

It is known to provide an interface between an existing local file system and a data store (e.g., a "write-once" store) to provide a "versioned" file system. The versioned file system comprises a set of structured data representations, such as XML. In a representative embodiment, at a first time, the interface creates and exports to a data store a first structured data representation corresponding to a first version of the local file system. The first structured data representation is an XML tree having a root element, a single directory (the "root directory") under the root element, zero or more directory elements associated with the root directory, and zero or more elements (such as files) associated with a given directory element. Each directory in turn can contain zero or more directories and zero or more files. Upon a change within the file system (e.g., file creation, file deletion, file modification, directory creation, directory deletion and directory modification), the interface creates and exports a second structured data representation corresponding to a second version of the file system. The second structured data representation differs from the first structured data representation up to and including the root element of the second structured data representation. Thus, the second structured data representation differs from the first structured data representation in one or more (but not necessarily all) parent elements with respect to the structured data element in which the change within the file system occurred. The interface continues to generate and export structured data representations to the data store, preferably at given "snapshot" times when changes within the file system have occurred. The data store can comprise any type of back-end storage device, system or architecture. In one embodiment, the data store comprises one or more cloud storage service providers (e.g., Amazon, Microsoft, etc.). As necessary, a given structured data representation is then used to retrieve an associated version of the file system. In this manner, the versioned file system only requires write-once behavior from the data store to preserve its complete state at any point-in-time.

FIG. 1 illustrates a local file system 100 and an object-based data store 102 as described in U.S. Pat. No. 8,880,474, which is hereby incorporated by reference. Although not meant to be limiting, preferably the object-based store 102 is a "write-once" store and may comprise a "cloud" of one or more storage service providers. An interface 104 provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, which a second portion resides in a second SSP. Generalizing, any given VFS portion may reside in any given data store (regardless of type), and multiple VFS portions may reside across multiple data store(s). The VFS may reside in an "internal" storage cloud (i.e., a storage system internal to an enterprise), an external storage cloud, or some combination thereof.

The interface 104 may be implemented as a machine. A representative implementation is the Nasuni® Filer, available from Nasuni Corporation of Massachusetts. Thus, for example, typically the interface 104 is a rack-mounted server appliance comprising of hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS®). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

SUMMARY

Aspects of the present disclosure are directed to methods and to systems, including, in a versioned file system (VFS) employing a VFS interface services to a local data storage system, a method for restoring such VFS interface services to the local data storage system by replacing a first VFS interface with a second VFS interface, the method comprising taking the first VFS interface offline so that it no longer accepts new data or requests for data from the local data storage system while maintaining the first VFS interface powered and running at least a first side-loading daemon on said first VFS interface; taking a snapshot of data from the first VFS interface and synchronizing said data from the first VFS interface to the VFS; taking the second VFS interface online so that it is powered, running at least a second side-loading daemon, and addressable using a network address; placing said first and second side-loading daemons in data communication with one another; receiving at the second VFS interface, through the second side-loading daemon, a copy of data from the first VFS interface, provided through said first side-loading daemon; and restoring VFS interface services to the local data storage system whereby the second VFS interface accepts data and requests for data from the local data storage system and services the same.

Other aspects are directed to a network accessible data storage architecture, comprising a network-connected versioned file system (VFS); a first VFS interface, coupled to said VFS, having a first VFS network address, and configurably adapted to service requests from a local data storage system if the first VFS interface is online and addressable by said local data storage system, and including a first side-loading daemon, and a data set stored in said first VFS interface; and a second VFS interface, coupled to said VFS, having a second network address, and configurably adapted to service requests from said local data storage system if the second VFS interface is online and addressable by said local data storage system, and including a second side-loading daemon configured to receive from the first side-loading daemon a copy of said data set; wherein said architecture is configured and adapted to service requests from the local data storage system, initially from said first VFS interface while it is online and addressable by the local data storage system, then from the second VFS interface after it is populated by said data set through the respective side-loading daemons of the second and first VFS interfaces.

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout.

DETAILED DESCRIPTION

Figure 1:
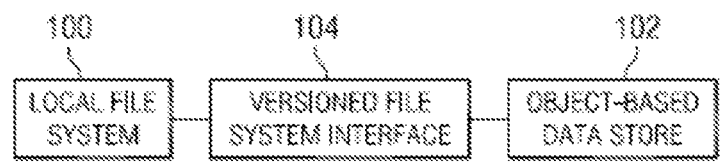
FIG. 1 illustrates a versioned file system coupled to a local data storage system and data store.
Figure 2:
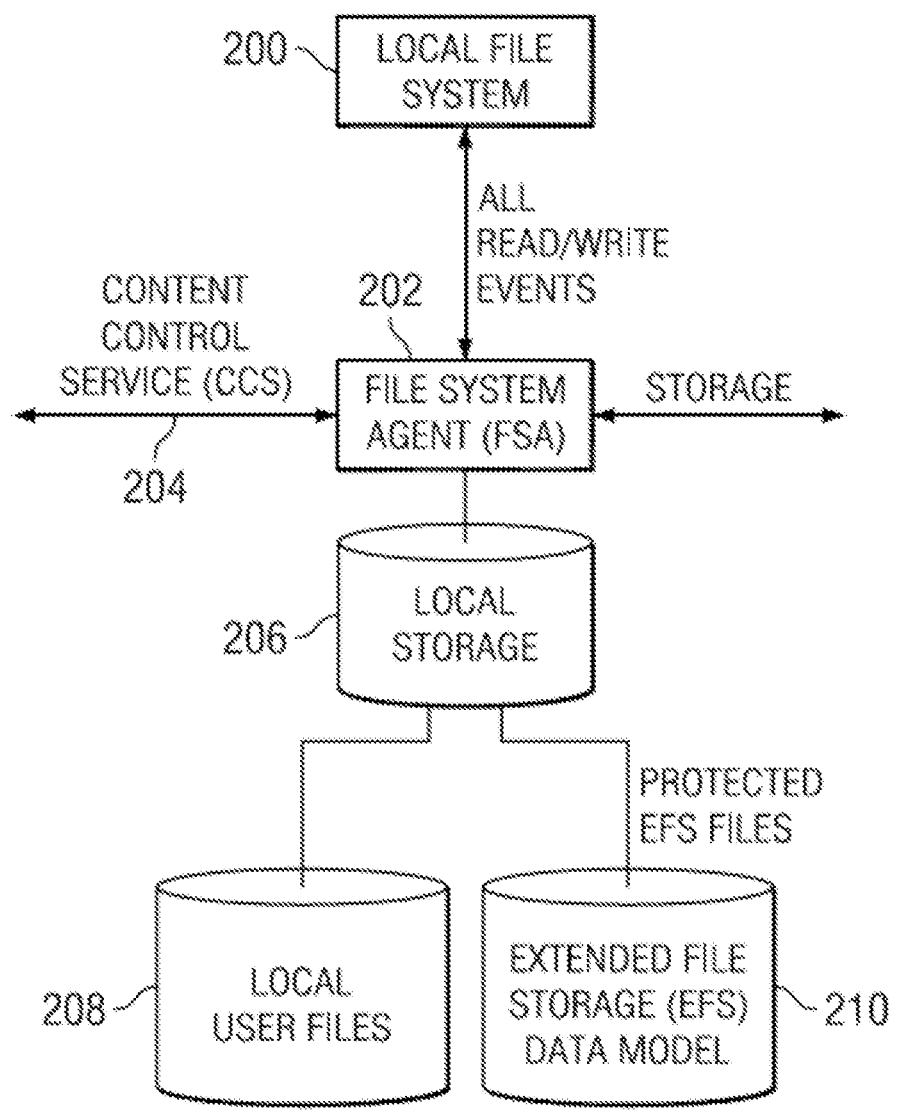
FIG. 2 illustrates an exemplary architecture of a local file system and storage elements.

FIG. 2 is a block diagram of a representative implementation of how a VFS interface captures all (or given) read/write events from a local file system 200, as disclosed in U.S. Pat. No. 8,880,474. In this example implementation, the interface comprises a file system agent (FSA) 202 that is positioned within a data path between a local file system 200 and its local storage 206. The file system agent 202 has the capability of "seeing" all (or some configurable set of) read/write events output from the local file system. The interface also comprises a content control service (CCS) 204. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
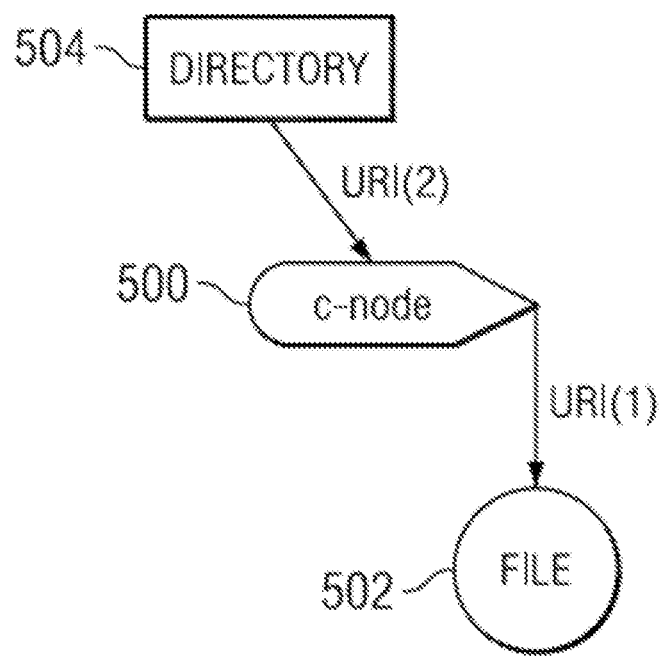
FIG. 3 illustrates a representation of files, c-nodes and directories in a tree structure.

FIG. 3 is a representation of a portion of a tree showing the basic elements that are represented in a versioned file system according to one embodiment. The reference numeral 500 is a c-node (or "cloud" node). A c-node preferably contains all of the information passed by a file system agent instance about an inode (or inode-equivalent) local file system. As will be seen in the examples below, the inode subset of the c-node includes data that would be returned by a typical "stat" function call, plus any additional extended attributes that are file system-dependent. One or more remaining parts of the c-node are used to provide a CCS super-user with additional access control and portability across specific file system instances. Stated another way, c-nodes preferably act as super-nodes for access control to files and metadata. While the inode sub-structure contains information from the original local file system, c-nodes allow administrators of the system to gain access to files in a portable, file system-independent manner. Preferably, each c-node is addressable by a URI. A c-node preferably also includes a pointer to the actual location of the data file. C-nodes indicate where the remote copies of the item may be found in the data store. The reference numeral 502 is a data file. This object represents the file preferably as it was created in the local file system. One of the main benefits to isolating the metadata in the c-nodes is that a user's data files can be stored with no modifications. As in a traditional file system, preferably the name of the file is stored in the directory or directories that contain it and not as part of the file itself. Preferably, URIs (for the actual data files in the cloud) remain opaque to the end-users, although this is not a requirement. An FSA instance controls access to the data file URIs through the respective c-nodes. The reference numeral 504 is a directory. Directories are c-nodes that contain a simple list relating names to the corresponding URIs for other c-nodes that, in turn, point to other files or directories. Directories provide a convenient way to establish a namespace for any data set. There can be multiple directories that point to the same files or directories. The above-described approach can support hard links or symbolic links. Hard links are simply multiple name entries that point to the same c-node. A symbolic link is a name entry that contains another name inside; when resolving the link, the entry is read and the resolution process is then restarted using the inner name. Directories are owned by their own c-node, which preferably holds its metadata and controls access to it.

Figure 4:
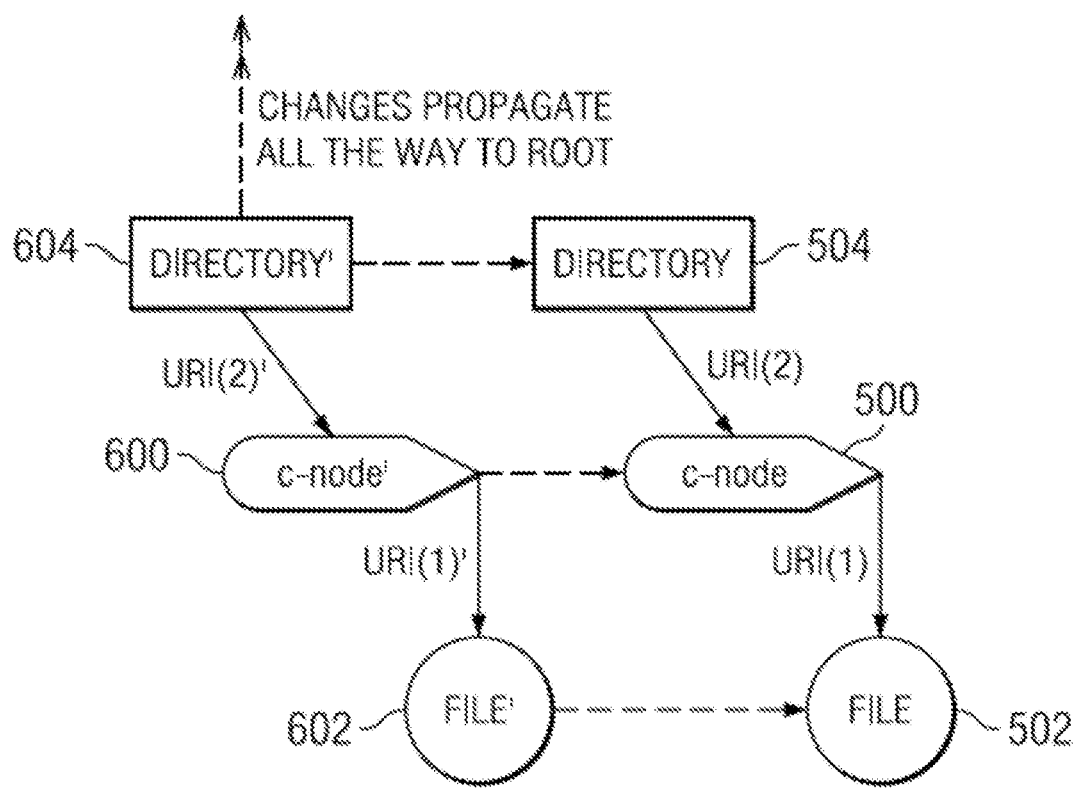
FIG. 4 illustrates a representation of a tree structure where changes are made to some elements thereof.
Figure 5:
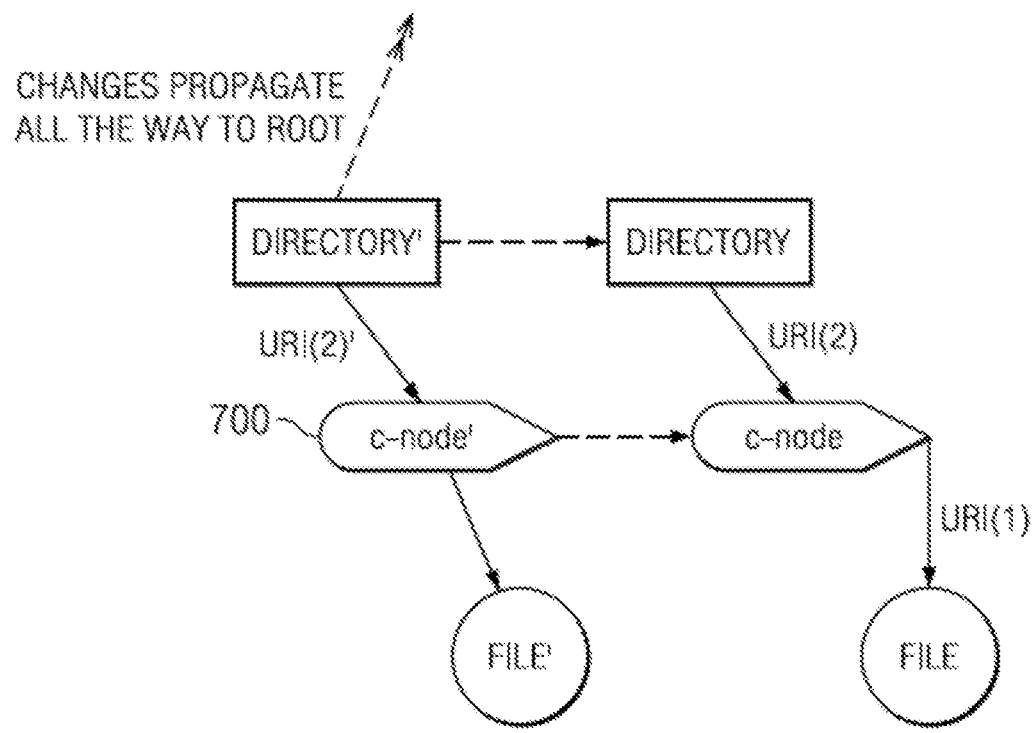
FIG. 5 illustrates another representation of a tree structure and changes made to some elements thereof.

FIG. 4 illustrates the portion of the tree (as shown in FIG. 5) after a change to the contents of the file 502 has occurred in the local file system. In this example, which is merely representative, a new version of the local file system is then created (preferably at a "snapshot" period, which is configurable). The new version comprises the file 602, the new c-node 600, and the new directory 604. As also seen in this drawing, the changes to the tree also propagate to the root. In particular, upon a given occurrence in the local file system (as will be described), a "new version" of the file system is created (for export to the cloud), and this new version is represented as a new structured data representation (e.g., a new XML document). As will be seen, the new structured data representation differs from the prior version in one or more parent elements with respect to the structured data element in which the change within the file system occurred. Thus, upon a change within the file system, the interface creates and exports to the data store a second structured data representation corresponding to a second version of the file system, and the second structured data representation differs from the first structured data representation up to and including the root element of the second structured data representation. In this manner, the interface provides for a "versioned" file system that has complete data integrity to the data store without requiring global locks.

The second structured data representation may "borrow" unchanged parts of the first structured data representation. Thus, the second structured data representation does not need to construct or even consider parts of the tree that were not changed; it just points to the same c-nodes that the first structured data representation does.

Figure 6:
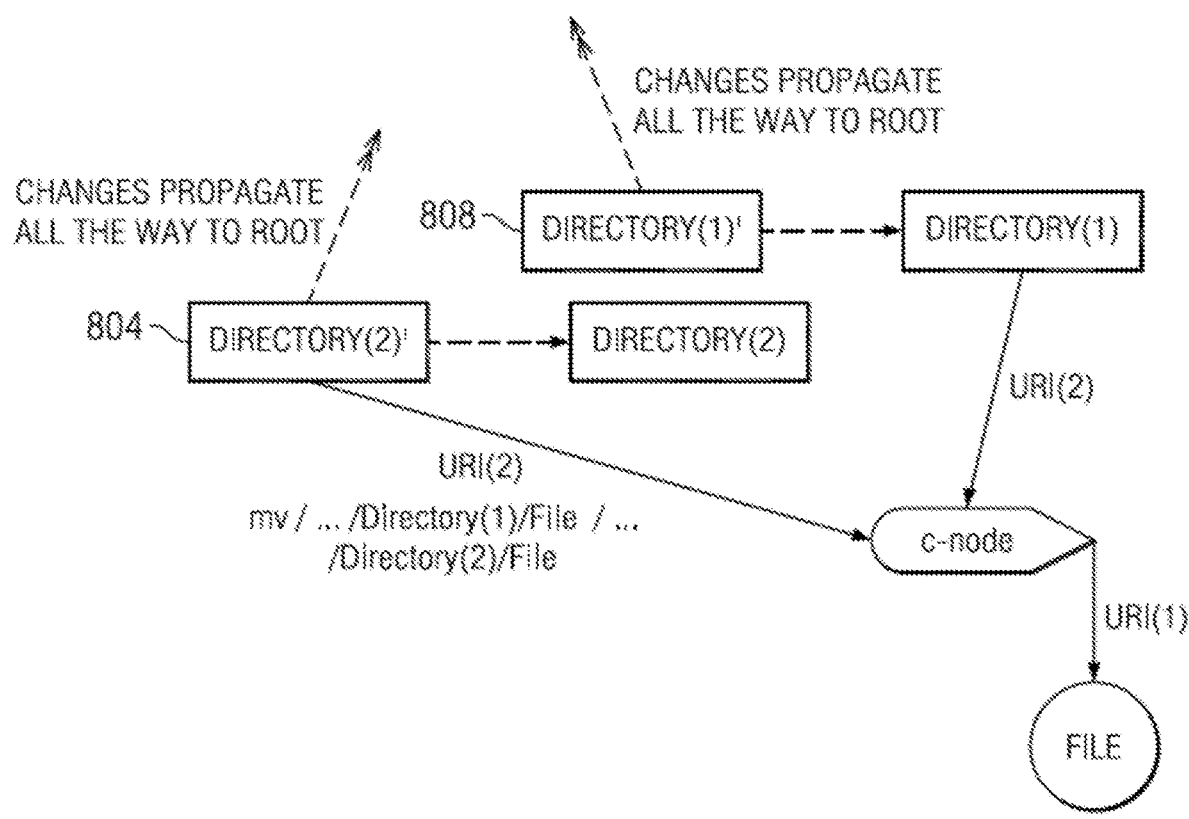
FIG. 6 illustrates a representation of yet another tree structure and changes made to some elements thereof.

FIG. 4 illustrates one type of change (a file update) that triggers the generation of a new version. FIG. 5 illustrates another type of change (an update to c-node 700) that also triggers the generation of a new version with changes propagated to root, and FIG. 6 illustrates yet another type of change (an update to each of the directories 804 and 808) that also implements a new version, once again with changes propagated to root. Generalizing, while the types of changes that trigger a new version may be quite varied, typically they include one of the following: file creation, file deletion, file modification, directory creation, directory deletion and directory modification.

Figure 7:
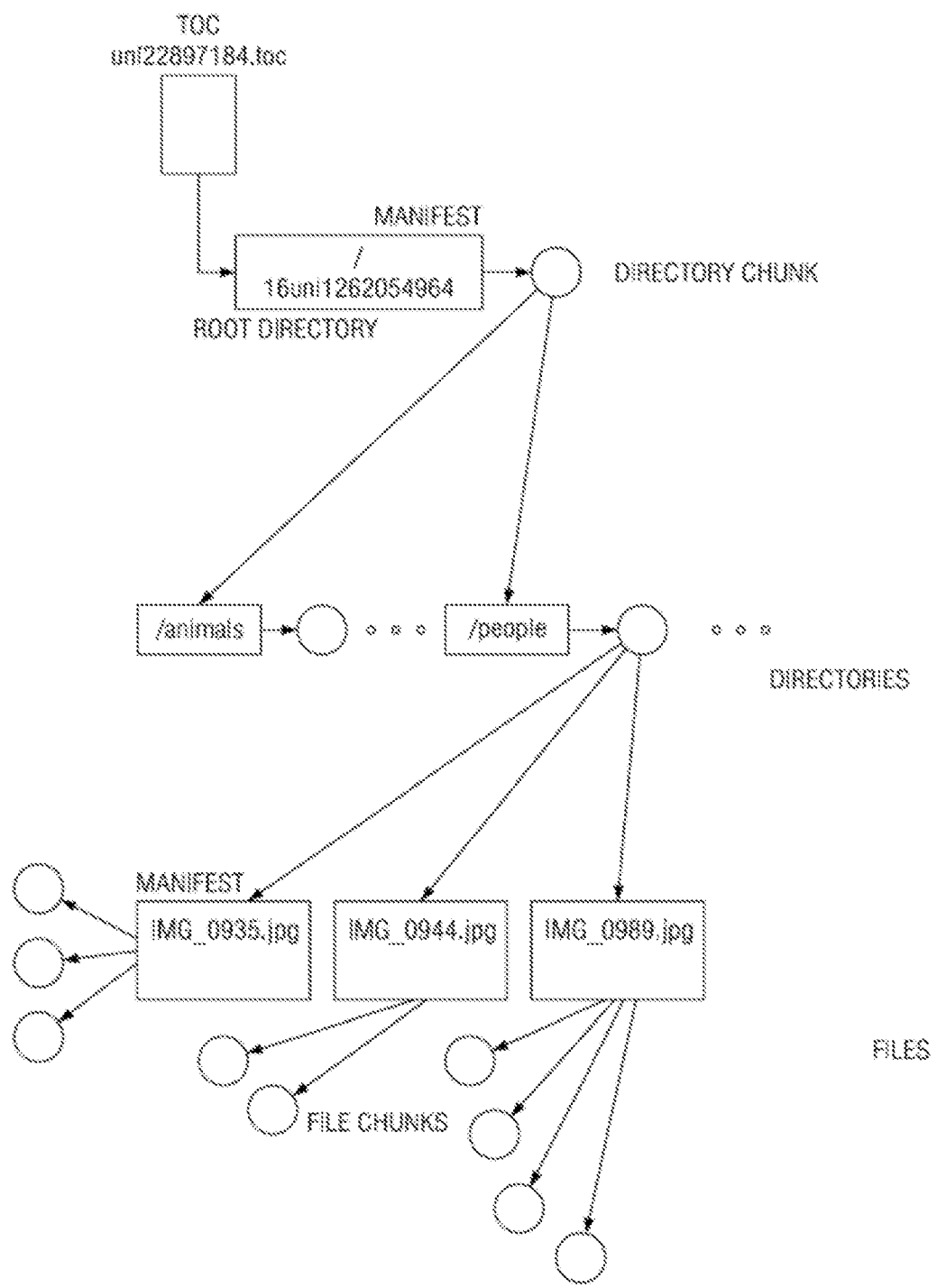
FIG. 7 illustrates a directory in a cloud architecture.
Figure 8:
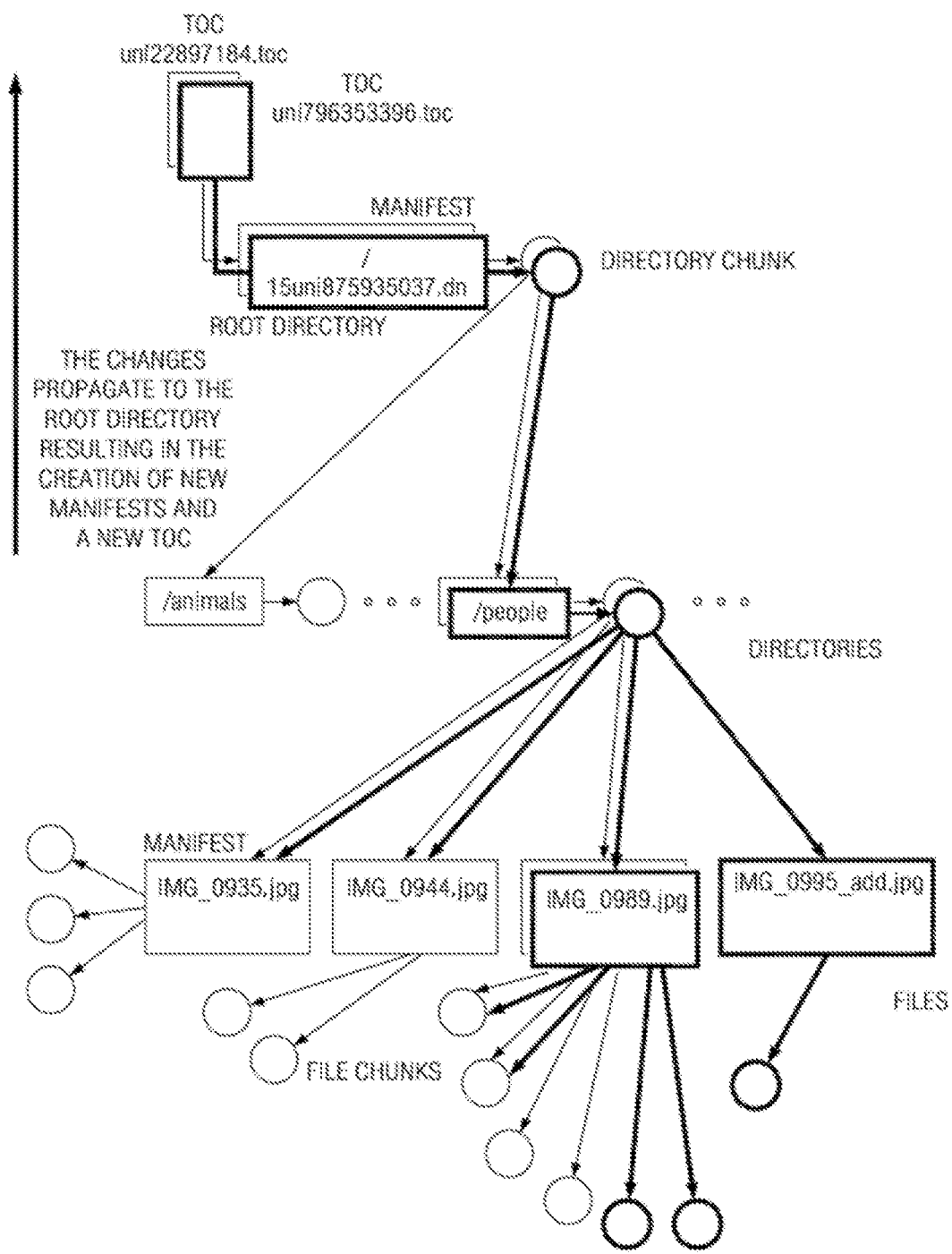
FIG. 8 illustrates a change to a directory in a cloud architecture.

FIG. 7 illustrates a directory tree in the cloud, and FIG. 8 illustrates the new version of that tree following several changes in the local file system. FIG. 7 is a simplified diagram. Because the data store is write-once, preferably a directory tree is pushed in two phases: phase 1 is all files (in any order), and phase 2 is all directories (in strict depth-first order). This allows a directory (in which the file or another directory is rooted) to be always written after the child file or directory is written. Other approaches may be used.

In a versioned cloud file system according to embodiment described in U.S. Pat. No. 8,566,362, issued on Oct. 22, 2013, the disclosure of which is incorporated herein by reference, a versioned file system (VFS) comprises a set of structured data representations such as XML documents and document fragments. Names are object references that typically are not parsed by the system. The handle names typically have no relation to the actual file names or content. The handle names in the XML preferably are prefixed with a length component. Also, for items other than the table of contents (TOC), the path and version elements in the XML are informative and need not be used by the system. The "path" typically represents the originating path (in the local file system) when the item was last updated. The "version" typically represents the version of root at the time the item was last updated. The table of contents (TOC) is a table at the head of every version; preferably, the TOC contains references to all versions.

In the versioned cloud file system, each file is represented by a manifest object, and a series of chunk objects. The manifest object comprises a listing of the chunk objects that make up the file and each entry in the manifest preferably comprises a handle, an offset, and chunk length. The entry also preferably identifies a number of the version in which the chunk was created. A directory in the versioned cloud file system is represented in a similar manner (as is a file), with the contents of the directory being a series of directory entries. A directory entry also comprises a name, as well as other attributes for the file/directory, as well as the handle for the manifest that represents the contents of the file/directory. As described, a version is defined as the tree of objects rooted at a particular root directory manifest. A file-system table of contents (TOC) contains the handle of a latest root directory manifest, as well as a list of all previously root directory manifests. For each table of contents entry, there is also preferably stored a timestamp, version number, and a borrow window (as noted above, preferably an unsigned integer). In the versioned cloud file system, each of the objects is a write-once object, and versions often share objects (file/directory manifests, file/directory chunks).

In order to replace or upgrade an active FSA without sacrificing performance degradation, the new FSA (e.g., server) needs to fully load its cache before the new FSA is turned online. Otherwise, the new FSA will be required to retrieve any requested files from the cloud, which is generally at least an order of magnitude slower than retrieving files from cache thus resulting in poor response time for users. Also, synchronizing the new FSA's cache consumes significant bandwidth and may take several days or even weeks due to the large amount of data (e.g., terabytes or petabytes). It would be desirable to have a more efficient system and method for updating or restoring an FSA.

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

Figure 9:
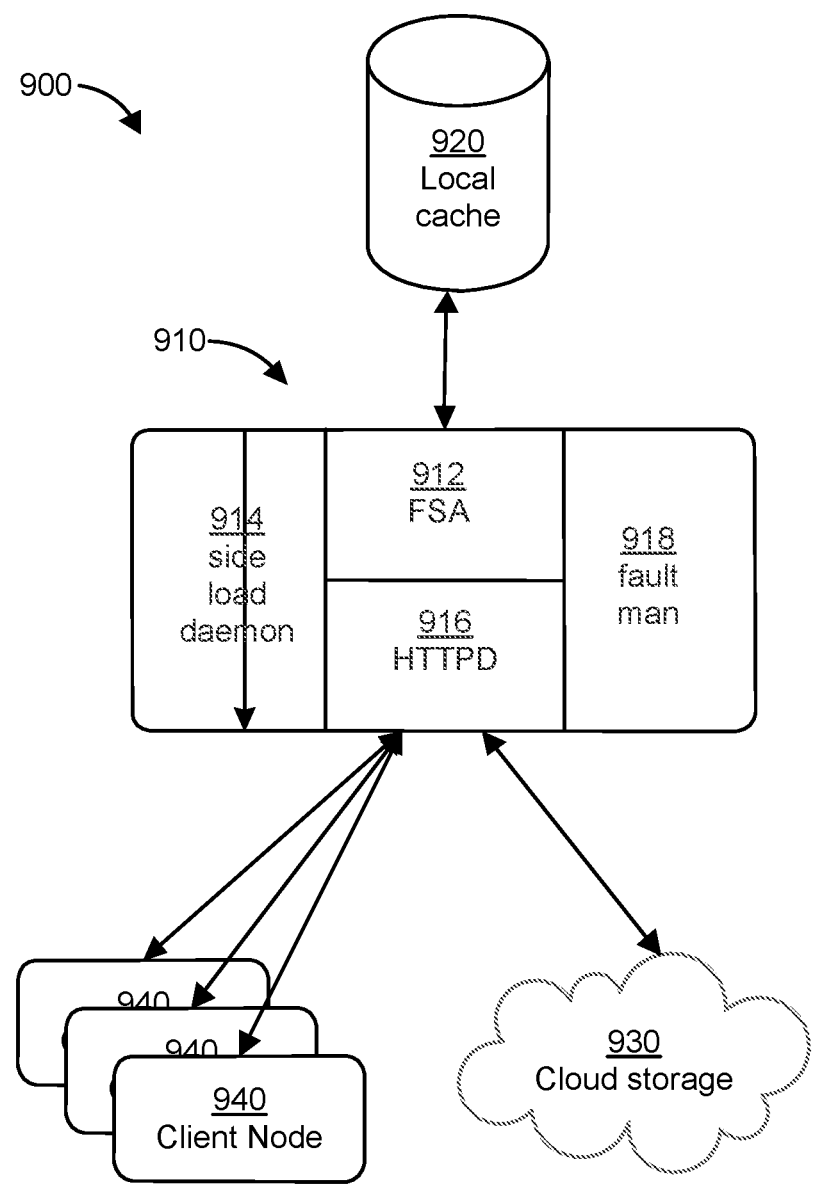
FIG. 9 illustrates an exemplary block diagram of a system for managing a global versioned file system.

FIG. 9 is a block diagram of a system 900 for managing a global versioned file system. The system 900 includes an interface 910, a local cache 920, a cloud storage repository 930, and a client node 940. The interface 910 includes a file system agent (FSA) 912, a side load daemon 914, an HTTP interface 916, and a fault manager 918. The interface 910 can include additional modules but such modules are not illustrated in FIG. 9 for simplicity. The FSA 912 can be the same or substantially the same as the FSA 202 described above.

In operation, the client node 940 requests a specific file or data (including a specific version) from the global file system. The request is sent from the client node 940 to the interface 910 via a network communication link. The FSA 912 processes the request and passes the requests to the fault manager 918. The fault manager 918 then queries the local cache 920 to determine if the requested file is already stored there (and thus can be provided from local cache 920). For example, the requested file may be stored in local cache 920 if another client node requested the same file (including version) at an earlier time. The requested file may also be in local cache 920 as a result of an auto-faulting algorithm in which the interface 910 pulls data proactively (as a background process) from the cloud to enhance performance. If the requested file is not available locally, there is a FSA 912 cache miss and the fault manager 918 initiates a request to retrieve the file from cloud storage repository 930 (e.g., Amazon). After the file is retrieved from the cloud 930, the interface 910 stores the file in local cache 920 so that it is available locally in case it is requested again by client node 940 or another client. Local cache 920 can be a large hard drive such as a solid state drive or a disk-based hard drive that can store terabytes of data (e.g., between about 2 to about 24 terabytes). In some embodiments, local cache 920 comprises an array of hard drives.

As files are stored in local cache 920, the FSA 912 keeps track (e.g., in a local database) of the state of the data stored in local cache 920. For example, the FSA 912 keeps track of the identity of the files stored in local cache 920, what portions or blocks of those files are stored in local cache 920, the version number of those files, and the metadata about the local cache 920 (e.g., location of the files/blocks, directory structure, etc.).

Figure 10:
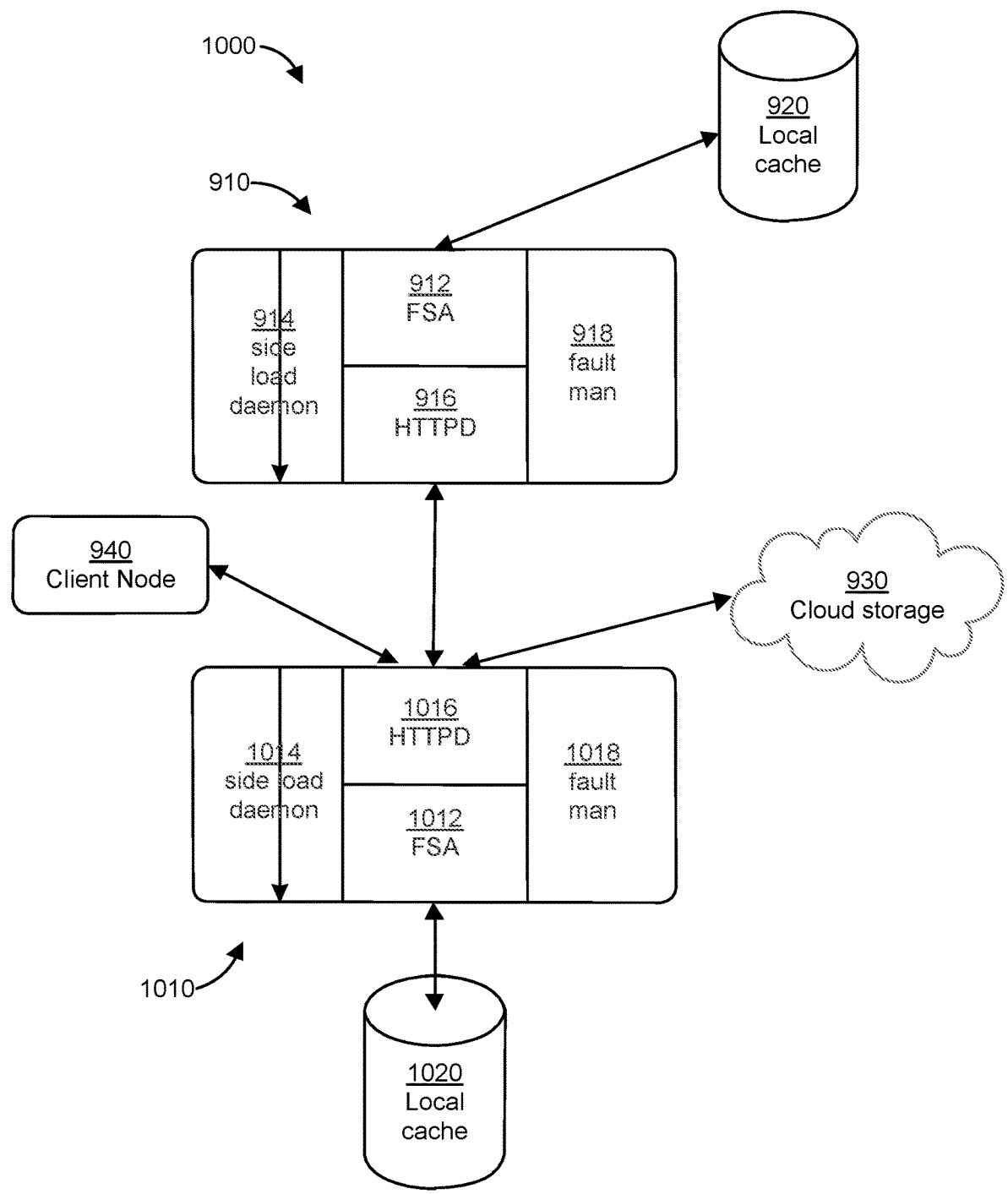
FIG. 10 illustrates an exemplary block diagram of a system for restoring or replacing/upgrading an interface for a global versioned file system.

FIG. 10 is a block diagram of a system 1000 for restoring or replacing/upgrading an interface for a global versioned file system. In the system 1000, a replacement interface 1010 is provided for example due to an upgrade of the server that hosted the interface 910. In order to replace the existing interface 910, the existing interface 910 is first taken offline to disable client access (e.g., access by client node 940). The interface 910 then synchronizes with and updates the cloud 930 with the latest data stored in local cache 920, for example using a snapshot algorithm. This occurs because there may be file updates that were received just before client access was disabled that were not transmitted to the cloud 930. Such updates need to be stored in the cloud 930 so that they are available for all global users. After synchronization with the cloud 930 is completed, the interface 910 shuts down except for side load daemon 914 and the HTTP interface 916. The side load daemon 914 can receive communication via the HTTP interface 916, for example, as calls to an API.

The replacement interface 1010 is powered on and configured with a routable network address (e.g., IP address, DNS name, etc.) and identity (e.g., serial number) of the decommissioned interface 910. In addition, the replacement interface 1010 is configured to communicate with the decommissioned interface 910 using a secure (e.g., encrypted) and authorized (e.g., through credentials such as a password) connection. The side load daemon 1014 on the replacement interface 1010 can then request that the decommissioned interface 910 transmit a copy of the database that includes the state of the data stored in local cache 920. Alternatively, the side load daemon 1014 can query the database on the decommissioned interface 910 for this information. The side load daemon 1014 processes the database and determines the identity of the files/data stored in local cache 920. The side load daemon 1014 then initiates a series of background requests to the decommissioned interface 910 to pull the files/data stored in local cache 920. In some embodiments, multiple requests are sent by the side load daemon 1014 in parallel. As the replacement interface 1010 receives the files/data from the decommissioned interface 910, the side load daemon 1014 populates a new database with identity of each file/data and the new location of the file/data in local cache 1020. This process is repeated for each entry in the database. As a result, all data from local cache 920 is copied to local cache 1020.

While the replacement interface 1010 copies the data from decommissioned interface 910 as a background process, the replacement interface 1010 is online and capable of receiving file requests from clients (e.g., client node 940). These requests are generally handled by the fault manager 1018. When a request is received, the fault manager 1018 first determines whether the data for a given file request is stored in local cache 1020. If the requested data cannot be retrieved from local cache 1020 (i.e., there is a local cache 1020 miss), the fault manager 1018 sends a message to side load daemon 1014 to request the data from decommissioned interface 910. The side load daemon 914 on the decommissioned interface 910 determines whether the requested data is stored in local cache 920. If the requested data is stored in local cache 920, the side load daemon 914 sends that data to the replacement interface 1010 via HTTP interfaces 916, 1016. The replacement interface 1010 then provides that data to the appropriate client node. In addition, the replacement interface 1010 copies the data to its local cache 1020 and updates the database on replacement interface 1010 as described above.

If the requested data is not stored in local cache 920, the side load daemon 914 returns an error message. If the decommissioned interface 910 returns an error message, the replacement interface 1010 (via the fault manager 1018)

requests the data or file from cloud storage 930. By first querying the decommissioned interface 910 for the data or file that resulted in the local cache 1020 miss, the replacement interface 1010 can provide a faster response time to the client 940 thus improving user experience. In some embodiments, retrieving the data or file that resulted in the local cache 1020 miss from the decommissioned interface 910 can result in a response time that is an order of magnitude faster than it would otherwise take to retrieve the same data or file from the cloud 930.

Alternatively, the replacement interface 1010 can request the file from the decommissioned interface 910 and the cloud 930 in parallel. The replacement interface 1010 can treat the parallel requests as a race condition in which the replacement interface 1010 acts on the first positive response to the request.

When the background process is complete and the replacement interface 1010 has copied the data from local cache 920, the side load process is complete. The replacement interface 1010 then returns to checking with the cloud 930 to determine if there are any changes to the files/data stored in local cache 1020 that need to be merged into local cache 1020. In some embodiments, the replacement interface 1010 determines a success rate of copying files/data during the background process. The success rate represents the percentage of files/data that the replacement interface 1010 successfully copied (e.g., without errors) from local cache 920 (via decommissioned interface 910). The replacement interface 1010 can have a threshold success rate for determining whether the background process successfully completed. In some embodiments, the threshold success rate is 85%, 90%, or 95%. If the threshold success rate is not met, an administrator can restart the background process, for example through an administrator user interface that can be accessed from the client 940. In some embodiments, the background process is automatically suspended if the success rate is less than or equal to 50% (i.e., the error rate is greater than or equal to 50%). The user or administrator can elect to restart the background process after the automatic suspension. In addition or in the alternative, the replacement interface 1010 (e.g., the fault manager 1018) can request the files/data that were not successfully copied from local cache 920 during the background process, from the cloud 930.

By querying (or copying) the database from the decommissioned interface 910 and copying the files/data from local cache 920, the replacement interface 1010 obtains both the files/data and the metadata about those files/data. The metadata can include both the immediate information about the file/data (e.g., file name, permissions, time stamp, etc.) and higher-level information about the files/data such as how they relate to each other (e.g., multiple blocks of data stored in different locations can belong to the same file). Alternatively, the replacement interface 1010 can retrieve metadata about the files/data from the cloud 930, which can ensure that the replacement interface 1010 references the latest copy of the files/data. In some embodiments, the replacement interface 1010 queries the database from the decommissioned interface 910 to obtain the immediate information about the files/data copied from local cache 920 while the replacement interface 1010 retrieves the higher-level information from the cloud 930.

In some embodiments, the principles of this disclosure can be applied to performing a local cache migration, for example from local cache 920 to a new local cache. The new local cache can be a replacement/upgrade of some or all of the hard disk array in local cache 920. For example, the new local cache can be a replacement to a SAN back end. In addition, or in the alternative, the new local cache can be a change to the file system format (e.g., due to an operating system change).

Figure 11:
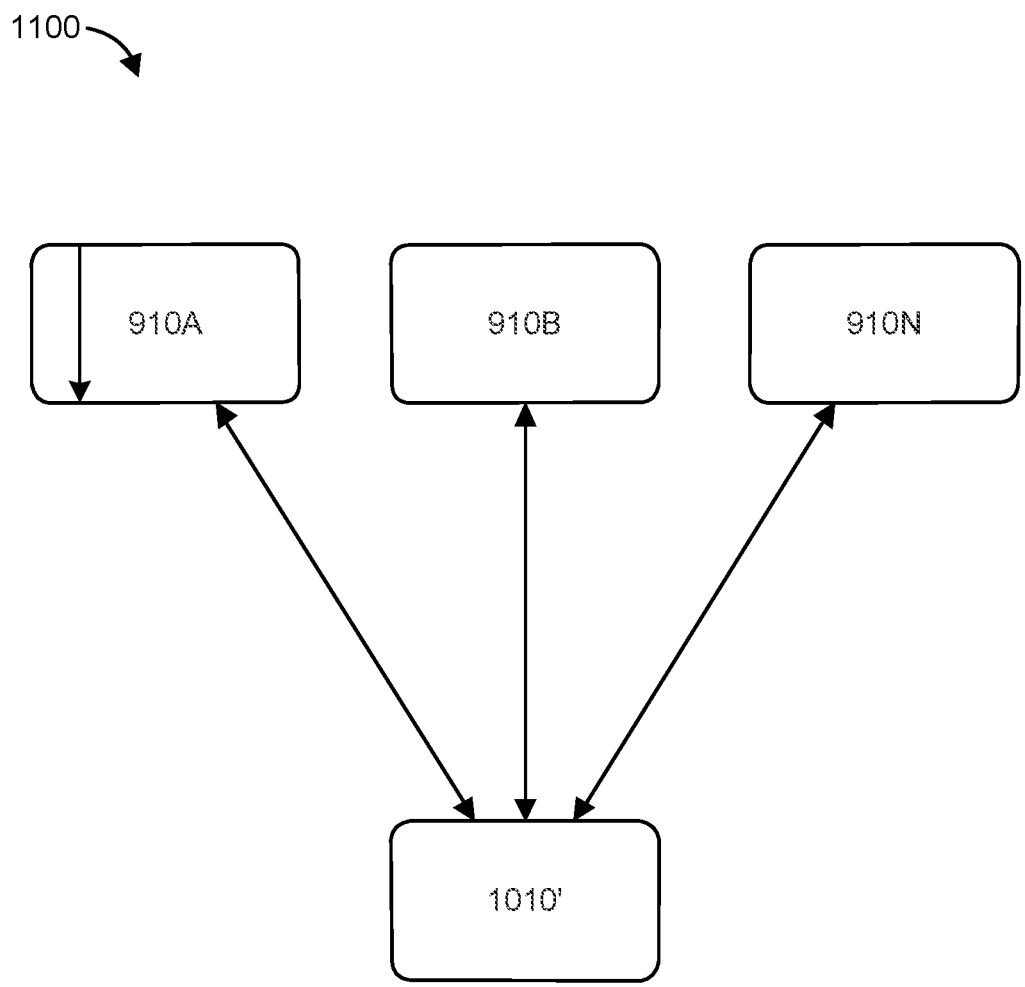
FIG. 11 illustrates an exemplary system in which multiple decommissioned interfaces are in communication with a single replacement interface.

While the disclosure has described a system for restoring an interface for a global versioned file system where there is only one decommissioned interface (e.g., decommissioned interface 910) and one replacement interface (e.g., replacement interface 1010), the principles of the disclosure can also be applied to multiple decommissioned interfaces and/or multiple replacement interfaces. For example, FIG. 11 illustrates a system 1100 in which multiple decommissioned interfaces 910A, 910B, 910N are in communication with a single replacement interface 1010'. In such a system 1100, the replacement interface 1010' requests the respective databases of the decommissioned interfaces 910A, 910B, 910N. The replacement interface 1010' can compare the respective databases to determine if all the file names or block names are identical (the location of storage will, of course, be different based on the interface). If all the file/block names are identical, the decommissioned interfaces 910A, 910B, 910N are mirrors images of each other. Therefore, the replacement interface 1010' can run a background process that makes requests in parallel to each decommissioned interface. For example, replacement interface 1010' can make a request for blocks A, B, and C from decommissioned interface 910A, for blocks D, E, and F from decommissioned interface 910B, and blocks G, H, and I from decommissioned interface 910N. Alternatively, each request can be sent to all of the decommissioned interfaces and the respective responses can be treated as a race condition. Such parallel requests can result in a quicker copying of the local cache.

Alternatively, each local cache of decommissioned interfaces 910A, 910B, 910N can include at least some files that are unique to each respective local cache. In that case, the replacement interface 1010' can copy the unique portions of the local cache from each decommissioned interface 910A, 910B, 910N. Any files that are not unique among the decommissioned interfaces 910A, 910B, 910N can be treated as if there are part of an identical local cache as described above.

If a user interface requests a file or data that has not yet been copied to the local cache of replacement interface 1010', the replacement interface 1010' can query one or multiple decommissioned interfaces 910A, 910B, 910N to determine if the requested file/data resides in the local cache of such decommissioned interface 910A, 910B, 910N. This can be done serially or in parallel with a query to the cloud, as described above.

Figure 12:
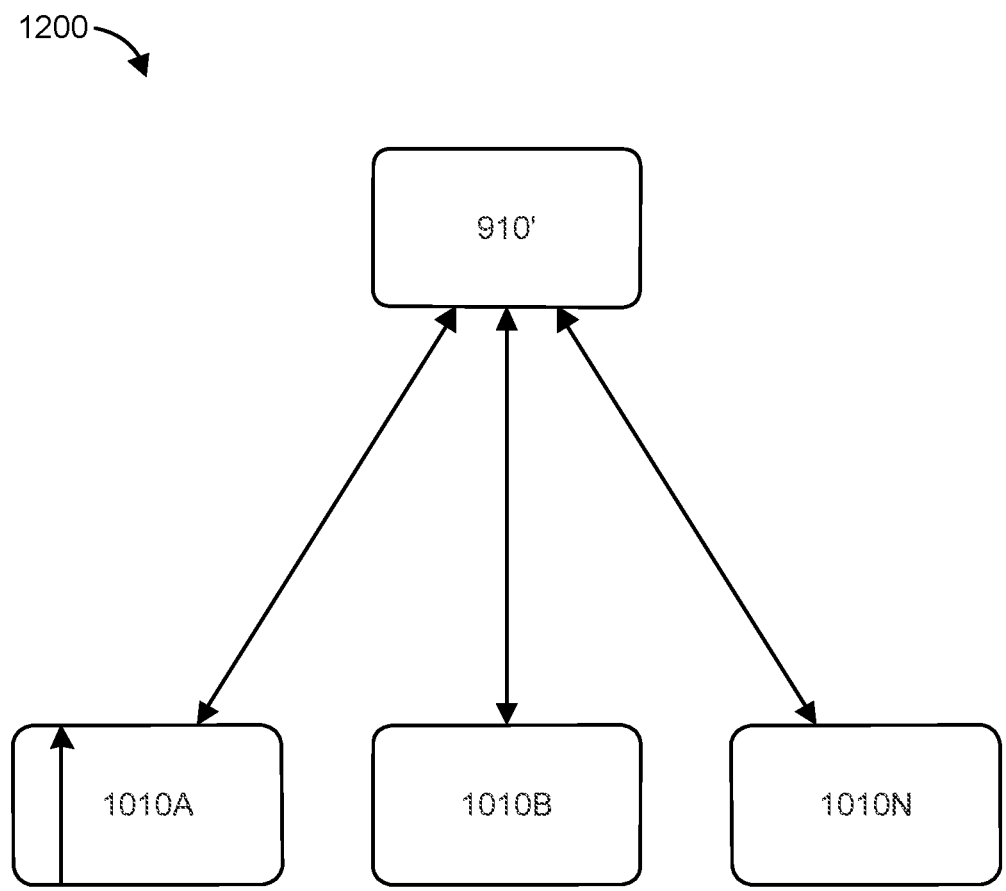
FIG. 12 illustrates an exemplary system in which a single decommissioned interface 910' is in communication with multiple replacement interfaces.

FIG. 12 illustrates a system 1200 in which a single decommissioned interface 910' is in communication with multiple replacement interfaces 1010A, 1010B, 1010N. In such a system 1200, the replacement interfaces 1010A, 1010B, 1010N each query (or request a copy of) the database of the decommissioned interface 910'. Each respective replacement interface 1010A, 1010B, 1010N can then run a background process to copy the contents of the local cache of decommissioned interface 910'. Alternative, the replacement interfaces 1010A, 1010B, 1010N can each request a respective portion of the local cache from decommissioned interfaces 910' so that the local cache is distributed across the replacement interfaces 1010A, 1010B, 1010N.

If a user interface requests a file or data that has not yet been copied to the local cache of a given replacement interface 1010N, the replacement interface 1010N can query the decommissioned interface 910' and/or the other replacement interfaces 1010A, 1010B to determine if the requested file/data resides in the local cache of such interface. This can be done serially or in parallel with a query to the cloud, as described above.

Figure 13:
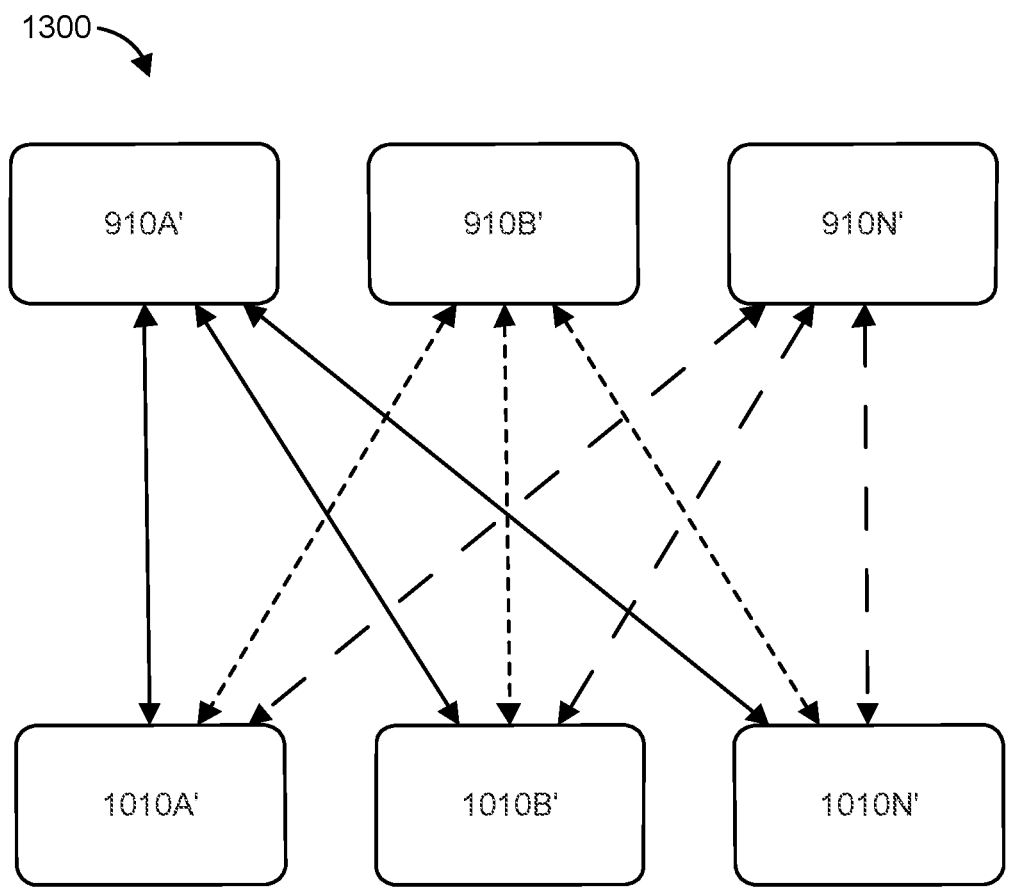
FIG. 13 illustrates an exemplary system in which multiple decommissioned interfaces are in communication with multiple replacement interfaces.

FIG. 13 illustrates a system 1300 in which multiple decommissioned interfaces 910A', 910B', 910N' are in communication with multiple replacement interfaces 1010A', 1010B', 1010N'. Such a system 1300 can operate similarly to systems 1100 and/or 1200.

The present disclosure only describes certain features and embodiments, but it should be appreciated that those skilled in the art would be able to extend the present discussion within the present scope to make many varieties of the present invention possible.

Unless otherwise defined, all technical and scientific terms used herein have the same meanings as are commonly understood by one of ordinary skill in the art to which this disclosure belongs. Although systems and methods similar or equivalent to those described herein can be used in the practice or testing of the present disclosure, suitable systems and methods are described herein. The present systems, methods, and examples are illustrative only and not intended to be limiting.

What is claimed is:

1. A method operative in a cloud storage-based versioned file system (VFS), comprising:
   taking a first VFS interface offline so that it no longer accepts new data or requests for data from a local data storage system while maintaining the first VFS interface powered and running a first daemon;
   while the first VFS interface is offline but powered and running the first daemon, bringing a second VFS interface online so that it is powered and running a second daemon;
   with the first VFS interface still offline, placing the first and second daemons in data communication with one another;
   with the first VFS interface still offline and the second VFS interface online, receiving at the second VFS interface, through the second daemon, a copy of data from the first VFS interface, the copy of data being provided through the first daemon as in a data transfer process, whereby the first VFS interface is upgraded to the second VFS interface without performance degradation; and
   while the data transfer process between the first and second daemons is on-going, and responsive to receipt of a request for information at the second VFS interface, retrieving the information from the second VFS interface, and returning the information in response to the request, thereby avoiding retrieval of the information from the cloud storage-based VFS.

2. The method of claim 1, wherein receiving said copy of the data comprises secure transmission of said data from the first daemon to the second daemon.

3. The method of claim 1, further comprising taking a third VFS interface online, and using a third VFS interface, coupling said third VFS interface to the first VFS interface so that both the second and third VFS interfaces replace said first VFS interface in servicing the local data storage system.

4. The method of claim 1, further comprising receiving at the second VFS interface, from the first VFS interface, a copy of a cached data.

5. The method of claim 1, further comprising receiving at the second VFS interface, from the first VFS interface, a copy of a directory structure.

6. The method of claim 1, further comprising taking the second VFS interface online by providing the second VFS interface with a reachable network address.

7. The method of claim 6, further comprising providing the second VFS interface with a reachable network address by assigning to the second VFS interface a same network address as was previously used by the first VFS interface.

8. The method of claim 6, further comprising providing the second VFS interface with a reachable network address by assigning to the second VFS interface a different network address than was previously used by the first VFS interface.

9. The method of claim 1, said steps representing a process for decommissioning at least one VFS interface, including the first VFS interface, and commissioning at least one VFS interface, including the second VFS interface.

10. A network accessible data storage architecture, comprising:
    a network-connected versioned file system (VFS);
    a first VFS interface, coupled to the VFS, servicing one or more requests from a local data storage system when the first VFS interface is online and addressable by the local data storage system, the first VFS interface including a first daemon, and a data set stored in the first VFS interface; and
    a second VFS interface, coupled to the VFS, servicing one or more requests from the local data storage system when the second VFS interface is online and addressable by the local data storage system, the second VFS interface including a second daemon receiving from the first daemon a copy of the data set in a data transfer process, whereby the first VFS interface is upgraded to the second VFS interface without performance degradation;
    wherein the network accessible data storage architecture is services the one or more requests from the local data storage system, initially from said first VFS interface while the first VFS interface is online and addressable by the local data storage system, then from the second VFS interface after the second VFS interface is populated by the data set through the respective second and first daemons of the second and first VFS interfaces;
    wherein as the data transfer process is on-going, at least one request is serviced from the local data storage system through the second VFS interface obtaining information from the first VFS interface, thereby avoiding retrieval of the information from the VFS.

11. The architecture of claim 10, further comprising a cloud interface between said VFS and each of the first and second VFS interfaces.

12. The architecture of claim 10 wherein the information is obtained from the first VFS interface upon a cache miss at the second VFS interface.

13. The architecture of claim 10 further including decommissioning the first VFS interface following completion of the data transfer process.

* * * * *